US009664356B2

(12) United States Patent
Pelka et al.

(10) Patent No.: US 9,664,356 B2
(45) Date of Patent: May 30, 2017

(54) ILLUMINATION LENS FOR SHORT-THROW LIGHTING

(71) Applicant: Seoul Semiconductor Co., Ltd., Ansan-si (KR)

(72) Inventors: David G Pelka, Los Angeles, CA (US); William A Parkyn

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 14/813,937

(22) Filed: Jul. 30, 2015

(65) Prior Publication Data

US 2015/0338056 A1 Nov. 26, 2015

Related U.S. Application Data

(63) Continuation of application No. 14/639,526, filed on Mar. 5, 2015, which is a continuation of application (Continued)

(51) Int. Cl.
*F21V 3/00* (2015.01)
*F21V 5/04* (2006.01)

(Continued)

(52) U.S. Cl.
CPC .................. *F21V 5/04* (2013.01); *F21K 9/60* (2016.08); *F21V 13/02* (2013.01); *F25D 27/00* (2013.01);

(Continued)

(58) Field of Classification Search
CPC .......... F21K 9/60; F21V 5/04; F21Y 2101/00; G02B 19/0028; G02B 19/0061
See application file for complete search history.

(56) References Cited

U.S. PATENT DOCUMENTS

| | | | |
|---|---|---|---|
| 7,273,299 | B2 | 9/2007 | Parkyn et al. |
| 7,348,723 | B2 | 3/2008 | Yamaguchi et al. |

(Continued)

FOREIGN PATENT DOCUMENTS

| | | |
|---|---|---|
| CN | 2054539 | 3/1990 |
| CN | 101561085 | 10/2009 |

(Continued)

OTHER PUBLICATIONS

Non-Final Office Action dated Oct. 7, 2016, in U.S. Appl. No. 14/639,526.

(Continued)

*Primary Examiner* — Ali Alavi
(74) *Attorney, Agent, or Firm* — H.C. Park & Associates, PLC

(57) ABSTRACT

An illumination lens includes a light incident surface that defines a cavity and has a flat top surface and lateral flanks, the light incident surface configured to receive light from an underlying light emitting element, a light exiting surface having a central indentation and surrounding toroid, and a bottom surface connecting the light incident surface and the light exiting surface. The lateral flank includes a first region extending from the top surface and a second region extended from the first region, the second region is a curved surface, of which the center of the curvature thereof lies on the illumination lens, an intersection of the second region and a horizontal optical axis forms a first point, and the first point is disposed lower than a second point where the bottom surface and the light exiting surface intersect.

11 Claims, 11 Drawing Sheets

59C
59
50
51
52
τ
53
58D
53B
58C
53A
54
53C
56
58
55
57

Related U.S. Application Data

No. 13/785,682, filed on Mar. 5, 2013, now Pat. No. 8,992,053.

(60) Provisional application No. 61/606,710, filed on Mar. 5, 2012.

(51) Int. Cl.

| | |
|---|---|
| ***F21V 13/02*** | (2006.01) |
| ***G02B 19/00*** | (2006.01) |
| ***F25D 27/00*** | (2006.01) |
| ***F21K 9/60*** | (2016.01) |
| *F21W 131/305* | (2006.01) |
| *F21W 131/405* | (2006.01) |
| *F21Y 101/00* | (2016.01) |

(52) U.S. Cl.

CPC ..... *G02B 19/0028* (2013.01); *G02B 19/0061* (2013.01); *F21W 2131/305* (2013.01); *F21W 2131/405* (2013.01); *F21Y 2101/00* (2013.01)

(56) References Cited

U.S. PATENT DOCUMENTS

| | | | | |
|---|---|---|---|---|
| 7,445,370 | B2 | 11/2008 | Ohkawa | |
| 7,621,657 | B2 | 11/2009 | Ohkawa | |
| 7,654,702 | B1 | 2/2010 | Ding et al. | |
| 7,674,019 | B2 | 3/2010 | Parkyn et al. | |
| 7,731,395 | B2 | 6/2010 | Parkyn et al. | |
| 7,798,679 | B2 * | 9/2010 | Kokubo | G02B 19/0014 362/334 |
| 2004/0095778 | A1 | 5/2004 | Zynda | |
| 2005/0195603 | A1 | 9/2005 | Hulse | |
| 2006/0138437 | A1 | 6/2006 | Huang et al. | |
| 2007/0091615 | A1 | 4/2007 | Hsieh et al. | |
| 2008/0278944 | A1 | 11/2008 | Yoon et al. | |
| 2009/0207586 | A1 * | 8/2009 | Arai | G02B 5/021 362/97.1 |
| 2011/0141734 | A1 | 6/2011 | Li et al. | |
| 2012/0014115 | A1 | 1/2012 | Park et al. | |

FOREIGN PATENT DOCUMENTS

| | | |
|---|---|---|
| EP | 2023038 | 2/2009 |
| JP | 2001-315380 | 11/2001 |
| JP | 2004-200236 | 7/2004 |
| JP | 2006-324256 | 11/2006 |
| JP | 2009-44016 | 2/2009 |

OTHER PUBLICATIONS

Notice of Allowance dated Jan. 5, 2017 in U.S. Appl. No. 14/672,530.

International Search Report issued on Sep. 25, 2013, in International Application No. PCT/IB2013/00460.

Written Opinion issued on Sep. 25, 2013, in International Application No. PCT/IB2013/00460.

Non-Final Office Action issued on Jul. 2, 2014, in U.S. Appl. No. 13/785,682.

Notice of Allowance issued on Nov. 24, 2014, in U.S. Appl. No. 13/785,682.

* cited by examiner

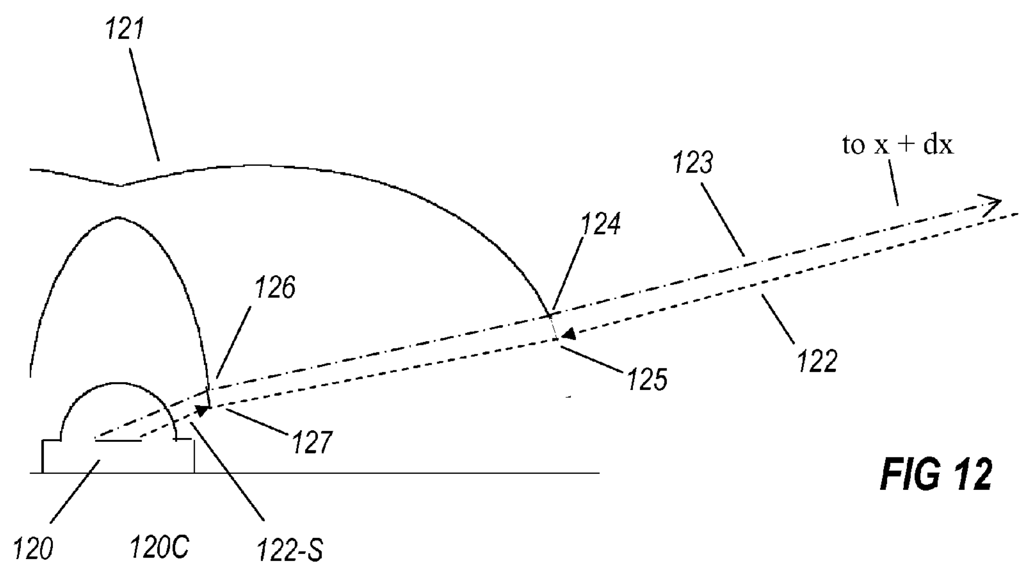
FIG 12
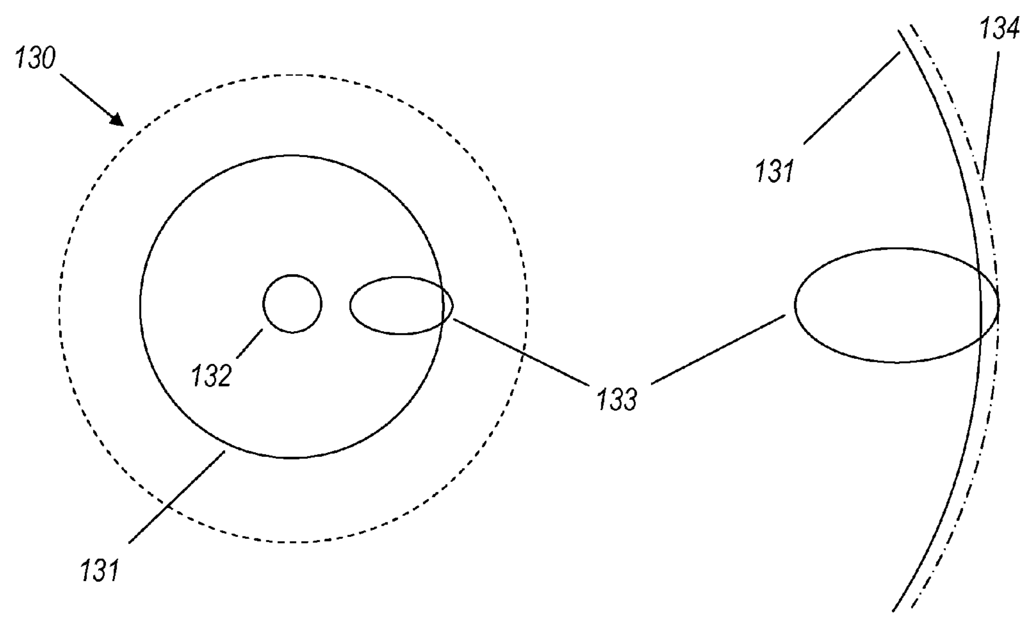
FIG 13A
FIG 13B

206
P2
ΔR2
R2
Δα2
α2
ΔR1
R1Δα1
P1
Δα1
R1
α1
207
208
τ1
X
Z
0
201
202
203
204
205
200

ILLUMINATION LENS FOR SHORT-THROW LIGHTING

CROSS-REFERENCE TO RELATED APPLICATION

This application is a continuation of U.S. patent application Ser. No. 14/639,526, filed on Mar. 5, 2015, which is a continuation of U.S. patent application Ser. No. 13/785,682, filed on Mar. 5, 2013, issued as U.S. Pat. No. 8,992,053, and claims the benefit of U.S. Provisional Patent Application No. 61/606,710, filed on Mar. 5, 2012, which are hereby incorporated by reference for all purposes as if fully set forth herein.

BACKGROUND

Field

Exemplary embodiments of the present invention relate to wide-angle illumination patterns suitable for short-throw lighting, and a general design method for generating their surface profiles.

Discussion of the Background

Light emitting diodes (LEDs) may generate light in zones so small (a few mm across) that it is a challenge to spread their flux uniformly over a large target zone, especially one that is much wider than its distance from the LED. So-called short-throw lighting, of close targets, is the polar opposite of spot lighting, which aims at distant targets. Just as LEDs by themselves may not produce a spotlight beam, and so need collimating lenses, they may be equally unsuitable for wide-angle illumination as well, and so need illumination lenses to do the job.

A prime example of short throw lighting is the optical lens for the back light unit (BLU) for a direct-view liquid crystal display (LCD) TVs. Here, the overall thickness of the BLU is usually 26 mm or less and the inter-distance between LEDs is about 200 mm. LCD backlighting may consist of fluorescent tubes arrayed around the edge of a transparent waveguide, that inject their light into the waveguide, which performs the actual backlighting by uniform ejection. While fluorescent tubes may be on the backlight perimeter due to their thickness, light-emitting diodes are so much smaller that they can be placed directly behind the LCD display, (so called "direct-view backlight"), but their punctate nature makes uniformity more difficult, prompting a wide range of prior art over the last twenty years. Not all of this art, however, was suitable for ultra-thin displays.

Another striking application with nearly as restrictive an aspect ratio is that of reach-in refrigerator cabinets. Commercial refrigerator cabinets for retail trade commonly have glass doors with lighting means installed behind the door hinging posts, which in the trade are called mullions. Until recent times, tubular fluorescent lamps have been the only means of shelf lighting, in spite of how cold conditions negatively affect their luminosity and lifetime. Also, fluorescent lamps may produce a very non-uniform lighting pattern on the cabinet shelves. Light-emitting diodes, however, may be favored by cold conditions and are much smaller than fluorescent tubes, which allow for illumination lenses to be employed to provide a much more uniform pattern than fluorescent tubes ever could. Because fluorescent tubes radiate in all directions instead of just upon the shelves, much of their light is wasted. With the proper illumination lenses, however, LEDs can be much more efficient, allowing lower power levels than fluorescent tubes, in spite of the latter's good efficacy.

LED illumination lenses can be classified into three groups, according to how many LEDs are used:

(1) Extruded linear lenses with a line of small closely spaced LEDs, such as described in U.S. Pat. Nos. 7,273,299 and 7,731,395.

(2) Circularly symmetric illumination lenses.

(3) Free-form illumination lenses with rectangular patterns, such as described in U.S. Pat. No. 7,674,019.

The first two approaches may require many LEDs in order to achieve reasonable uniformity, but recent trends in LEDs have produced such high luminosity that fewer LEDs may be needed, allowing significant power savings. This is the advantage of the last approach, but free-form lenses generating rectangular patterns have proved difficult to produce, via injection molding, with sufficient figural accuracy for their overlaps to be caustic-free (caustics are conspicuous small regions of elevated illuminance).

The prior art is even more challenged, moreover, when fewer LEDs are needed due to ongoing year-over-year improvements in LED flux output. After all, backlight thickness actually relative to the inter-LED spacing, not to the overall width of the entire backlight. For example, in a 1" thick LCD backlight with 4" spacing between LEDs, the lens task is proportionally similar to the abovementioned refrigerator cabinet. Because of the smaller size of an LCD as compared to a 2.5 by 5 foot refrigerator door, lower-power LEDs with smaller emission area may be used, typically a Top-LED configuration with no dome-like silicone lens.

Non-specific design methods for addressing this problem may be found in U.S. Pat. Appl. No. 2006/0138437 and U.S. Pat. Nos. 7,348,723; 7,445,370; 7,621,657; and 7,798,679. U.S. Pat. No. 7,798,679, however, contains only generically vague descriptions of that lens profile, and has no specific method of distinguishing the vast number of significantly different shapes fitting its general description.

Experience has shown that illumination lenses may be unforgiving of small shape errors, such as result from unskilled injection molding or subtle design flaws. Very small changes in local slope of a lens can result in highly visible illumination artifacts sufficient to ruin an attempt at a product. Therefore such generic descriptions, such those in U.S. Pat. No. 7,798,679, may be insufficient for practical use, because even the most erroneous and ill-performing lens fulfills them just as well as an accurate, high-performing lens. Further, U.S. Pat. No. 7,798,679 never provides the specific, distinguishing shape-specifications whose precise details are so necessary for modern optical manufacturing.

SUMMARY OF THE INVENTION

Disclosed herein are embodiments that generate wide-angle illumination patterns suitable for short-throw lighting. Also disclosed is a general design method for generating their surface profiles, one based on nonimaging optics, specifically a new branch thereof, photometric nonimaging optics. This field applies the foundational nonimaging-optics idea of etendue in a new way, to analyze illumination patterns and classify them according to the difficulty of generating them, with difficulty defined as the minimum size lens required for a given size of the light source, in this case, the LED.

It is the first objective of this invention to disclose numerically-specific lens configurations that in arrays will provide uniform illumination for a close planar target, especially in retail refrigeration displays and in thinnest-possible direct-view LCD backlights.

It is the second objective of this invention to provide compensation for the illumination-pattern distortions caused by volume scattering and scattering due to Fresnel reflections, which together act as an additional, undiscriminating secondary light source.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 12 shows the method of profile generation according to FIG. 11.

FIGS. 13A and 13B show the 3D source-image method of profile generation.

DETAILED DESCRIPTION OF THE ILLUSTRATED EMBODIMENTS

Figure 1:
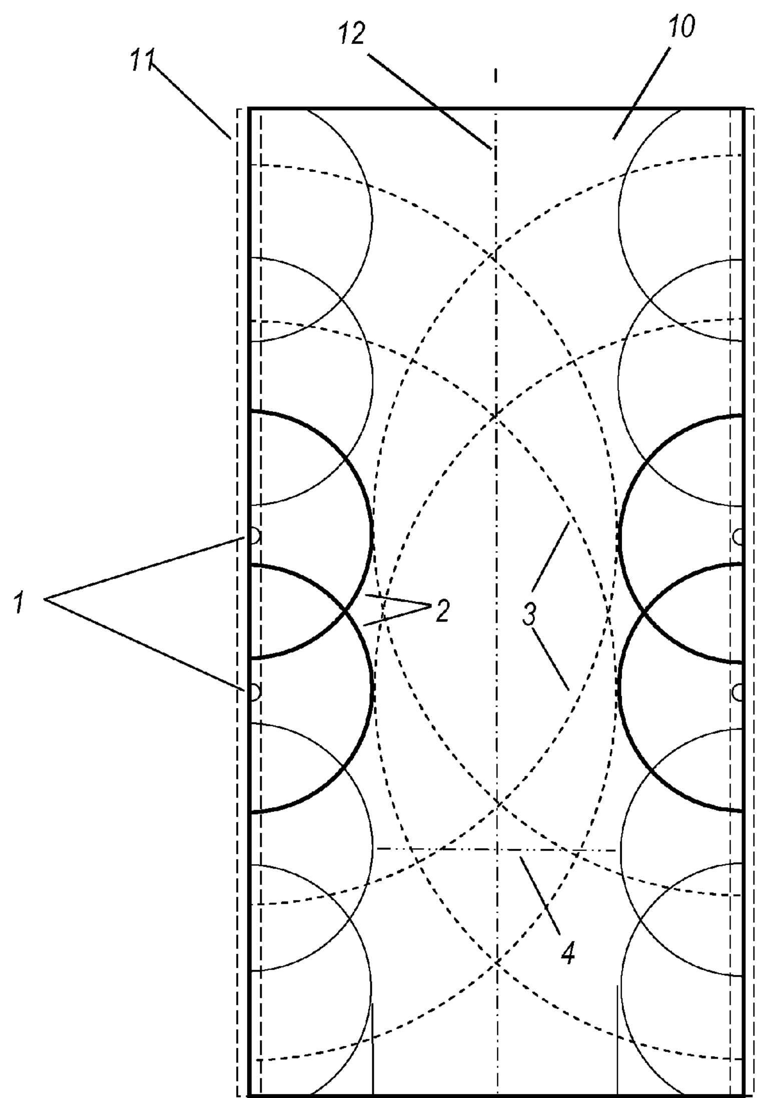
FIG. 1 shows a rectangular door illuminated by circular patterns.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Commercial refrigerator display cabinets for retail sales have a range of distances from mullion to the front of the shelves, commonly from 3" to 8", with the smaller spacing becoming more prevalent as store owners seek to cram more and more product into their reach-in refrigerator cabinets. Fluorescent tubes have great difficulty with these tighter spacing, leading to an acceleration in the acceptance of LED lighting technology. Even though fluorescent tubes have efficacy comparable to current LEDs, their large size and omnidirectional emission hamper their efficiency, making it difficult to adequately illuminate the mid-shelf region. Early reach-in refrigerator LED illuminators utilized a large number of low-flux LEDs, but continuing advances in luminosity enable far fewer LEDs to be used to produce the same illuminance. This places a premium on having illumination lenses that when arrayed will sum up to uniformity while also having the smallest possible size relative to the size of the LED.

FIG. 1 shows rectangular outline 10 representing a typical refrigerator door that is 30" wide and 60" high, with other doors, not shown, to either side. Dashed rectangles 11 denote the mullions behind which the shelf lighting is mounted, typically at 3-6" from the front of the illuminated shelves. This is much closer than the distance to the shelf center, denoted by centerline 12. There are twelve illuminators (six on either side), four of which are denoted by small circles 1. Each illuminator produces an illuminated circle with its peak on a ring denoted by solid circles 2 and its edge on dotted circles 3. Here the circles 2 have radius of a quarter of the shelf width, or halfway to centerline 12. The circles 3, where illuminance has fallen to zero, are sized to meet the circles 2 from the opposite mullion.

Figure 2:
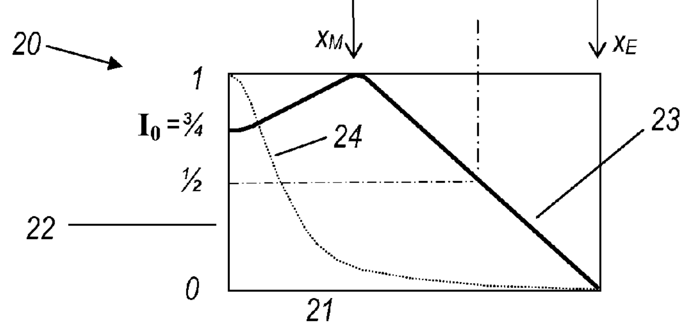
FIG. 2 shows a graph of an individual illumination pattern.

FIG. 2 shows graph 20 with abscissa 21 that is horizontally scaled the same as FIG. 1 above it. Ordinate 22 is scaled from 0 to 1, denoting the ideal illuminance I(x), as graphed by curve 23, generated on the shelves by an illuminator under the mullion. This illumination function is relative to the maximum on circle 2, which has radius $x_M$. It falls off to zero at radius $x_E$. This gradually falling illuminance is paired with the gradually ascending one of the illuminator on the opposite side of the door, so the two patterns add up to constant illuminance along the line 4 of FIG. 1.

An actual injection-molded plastic lens will exhibit volume scattering within its material, making the lens itself an emitter rather than a transmitter. This volume scattered light will be strongest just over the lens. The central dip in the pattern 23, shown in FIG. 2 to be at the ¾ level, compensates for this extra volume-scattered light, so that the total pattern (direct plus scattered) is flat within circle 2. This effect becomes more pronounced with the larger lenses discussed below.

Another advantage of this type of gradually falling-off pattern is that any point on centerline 12 is lit by several illuminators on each mullion, assuring good uniformity. The dotted curve 24 shows the illumination pattern of an LED alone. It is obviously incapable of adding up to satisfactory illumination, let alone uniform, hence the need for an illumination lens to spread this light out properly.

Figure 3:
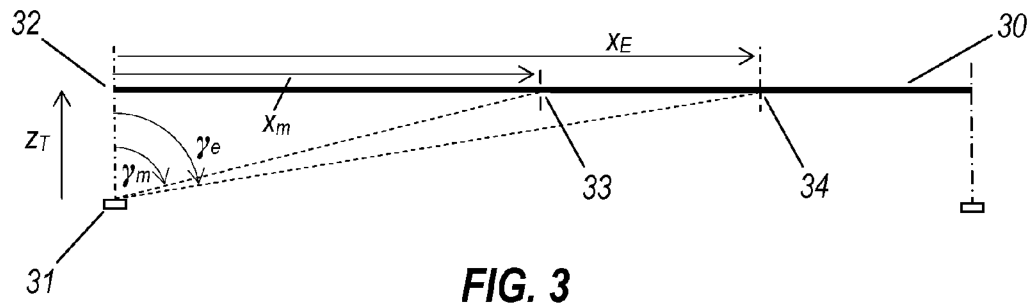
FIG. 3 shows an end view of the door of FIG. 1, with slant angles.

FIG. 3 shows an end view of shelf-front rectangle 30 identical to that of FIG. 1. Illuminators are located as shown by small rectangles 31. The strategy of this invention addresses the difficulty of lighting from so close to the shelf, in this case at a distance of $z_T$=4". FIG. 3 shows the distances $x_m$=15" and $x_E$=22.5", respectively, to centerline 33 and edge-line 34, at which the pattern of illuminator 31 has reached zero illuminance. These distances correspond to off-axis angles from the normal given by $$\gamma_m=\tan^{-1}(x_m/z_T)=\tan^{-1}(15/4)=75° \quad \gamma_E=\tan^{-1}(x_E/z_T)=\tan^{-1}(22.5/4)=80°$$

These large slant-angles drive the lens design, requiring considerable lateral magnification of the source by the lens. At low slant-angles, in contrast, the lens must demagnify.

This concept of magnification and demagnification can be made more explicit via etendue considerations. The source-etendue is that of a chip of area $A_S$=2.1 mm², immersed in a dome of refractive index n=1.45:

$$E_S=\pi n^2 A_S \sin^2\theta=14 \text{ mm}^2$$

Here θ is 90° for a Lambertian source of which an LED is a very good approximation°.

An illumination lens basically redistributes this etendue over the target, which is much larger than the chip. In the case of the illumination pattern in FIG. 2, the target etendue relates to the area $A_T$ of the 45" illumination circle of FIG. 1, as weighted by the relative illumination function 23 of FIG. 2. This simple model of an actual illumination pattern has a central dip to illuminance $I_0$, a rise to unity at $x=x_M$, and a linear falloff to zero at $x=x_E$. This is mathematically expressed as $$I(x)=I_0+x(1-I_0)/x_M \quad x\le x_M$$

$$I(x)=(x_E-x)/(x_E-x_M) \quad x_M\le x\le x_E$$

Then the target etendue is given by an easily solved integral:

$$E_T=\pi\sin^2\theta_T\int_0^{xe}2\pi x I(x)\,dx = 2\pi^2\sin^2\theta_T\left(\left[\frac{I_0x^2}{2}+\frac{(1-I_0)x^3}{3x_M}\right]_0^{x_M}+\left[\frac{x_E}{2(x_E-x_M)}x^2-\frac{x^3}{3(x_E-x_M)}\right]_{x_M}^{x_E}\right)$$

-continued $$E_T=\sin^2\theta_T \ 1.47 \text{ square meters}$$

Here $\theta_T$ is the half angle of a narrow-angle collimated beam with the same etendue as the source, so that $$\sin^2\theta_T\sim 1E\text{-}5 \quad \theta_T=\pm 0.18°$$

At the center of the lens this is reduced by ¾, to ±0.13°. This can be contrasted with the angular subtense of the source alone, as seen from directly above it on the shelf, at distance $z_T$ as shown in FIG. 3:

$$\tan^2\theta_S=n^2A_C/4z_T^2 \quad \theta_S=\pm 0.61°$$

Thus the central demagnification of the lens needs to be 1:4.5, dictating that the central part of the lens be concave, in order to act as an expander with negative focal length. This can be attained on a continuum of concavity bounded by a flat-topped outer surface with a highly curved inside surface or a flat-topped inner surface with the outer surface highly curved. That of FIG. 5 lies between these extremes.

As shown in FIG. 3, a high slant angle γ means that to achieve uniform illumination the source image made by the lens must be correspondingly larger than for normal incidence, by a factor of 1/cos γ. The source itself will be foreshortened by a slant factor of cos γ, as well as looking smaller and smaller by being viewed from farther away, by a further factor of cos²γ. Thus the required lens magnification is $$M(\gamma)=\frac{1}{4.5\cos^4\gamma}$$

Note that magnification rises from ¼ on-axis to unity at an off-axis angle given by $$\gamma(M)=\cos^{-1}\sqrt[4]{\frac{1}{4.5M}}$$

$$\gamma(1)=47°$$

These angles dilute the illuminance by a cosine-cubed factor, so that the farther out light must be thrown, the more intense must be the lens output. Considering that the LED source has a cosine fall-off of its own, the total source magnification required is the well-known $\cos^{-4}$ factor, amounting to 223 at 75° 1100 at 80° respectively. Here lies the advantage of the fall-off in the illumination pattern of FIG. 2, since these deleterious factors are reduced accordingly.

Figure 4:
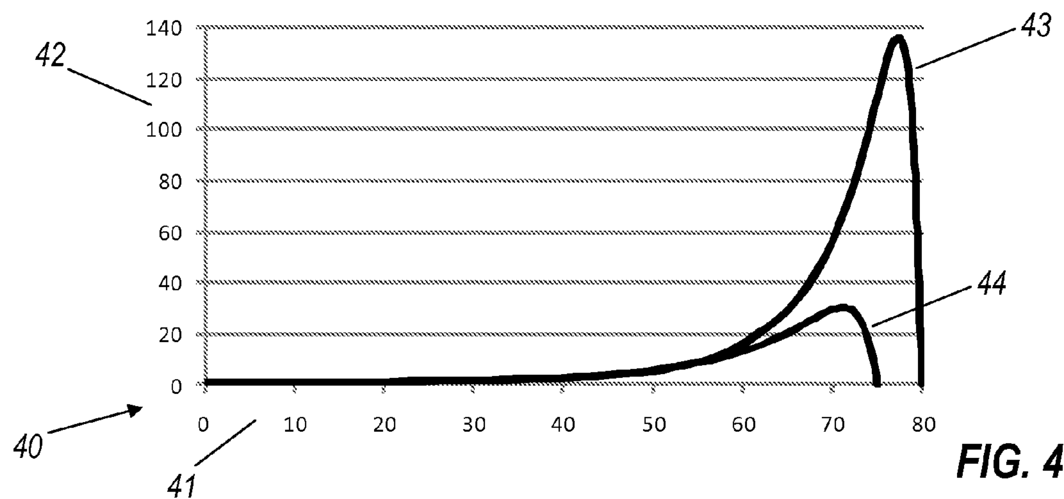
FIG. 4 shows a graph of required source magnification.

FIG. 4 shows graph 40 with abscissa 41 running from 0 to 80° in off-axis angle γ and ordinate 42 showing the source magnification M(γ) required for uniform illumination. Unit magnification is defined as a source image the same size as if there were no lens. What this magnification means is that the illumination lens of the present invention must produce an image of the glowing source, as seen from the shelf, that is much bigger than the Lambertian LED source without any lens. For uniformly illuminating a 4" shelf-distance, curve 43 shows that the required magnification peaks at 77.5°, while lower curve 44 is for the much easier case of a 6" shelf distance, peaking at 71°. This required image-size distribution is the rationale for the configuration of the present invention.

Figure 5:
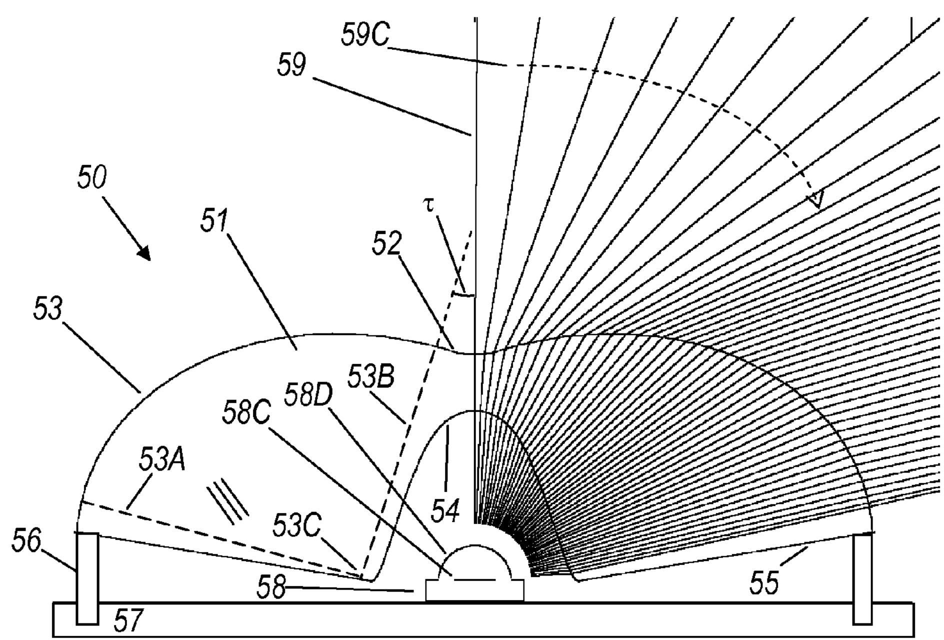
FIG. 5 shows a cross-section of an illumination lens and LED.

FIG. 5 is a cross-section of illuminator 50, comprising illumination lens 51, bounded by an upper surface comprising a central spherical dimple with arc 52 as its profile and a surrounding toroid with elliptical arc 53 as its profile, and also bounded by a lower surface comprising a central cavity with bell-shaped profile 54 and surrounding it an optically inactive cone joining the upper surface, with straight-line profile 55 and pegs 56 going into circuit board 57. Illuminator 50 further comprises LED package 58 with emissive chip 58C immersed in transparent hemispheric dome 58D. The term 'toroid' distinguishes from the conventional term 'torus', which solely covers the case of zero tilt angle. The highly oblique lighting setup of refrigerator-cabinet shelf-fronts quite understandably involves tilting the torus so that the lensing effect of the elliptical arc points toward the center of the shelf.

Arc 52 of FIG. 5 extends to tilt angle $\tau$, which in this case is 17°, its importance being that it is the tilt angle of major axis 52A of elliptical arc 52. Its minor axis 52B lines up with the radius at the edge of arc 51, ensuring profile-alignment with equal surface tangency. There are three free parameters which define a particular outer surface of illumination lens 51, as intended for different shelf distances. The first is the radius of arc 52, which controls the amount of de-magnification by the central portion of illumination lens 51. The second is the tilt angle $\tau$, which defines the orientation of elliptical arc 53, namely towards the shelf center of FIG. 1. The third free parameter of the upper surface is the ratio of major axis 53A to minor axis 53B, in this case 1.3:1, defining the above-discussed source magnification. Ray-fan 59 comprises central rays (i.e., originating from the center of chip 58C) at 2° intervals of off-axis angle. The central ten rays designated by dotted arc 59C illustrate the diverging character of the center of lens 51, which provide the central demagnification required for uniform illumination. The remaining rays are all sent at steep angles to the horizontal, providing the lateral source magnification of FIG. 4.

The central cavity surrounding LED 58 has bell-shaped profile 54 defined by the standard aspheric formula for a parabola (i.e., conic constant of −1) with vertex at $z_v$, vertex radius of curvature $r_c$, $4^{th}$-order coefficient d and $6^{th}$-order coefficient e:

$$z(x)=z_v+x/r_c+dx^4+ex^6$$

In order for profile 54 to arc downward rather than upward, the radius of curvature $r_c$ is negative. The aspheric coefficients provide an upward curl at the bottom of the bell, to help with cutting off the illumination pattern. The particular preferred embodiment of FIG. 5, with a cavity entrance-diameter set at 6.45 mm, is defined by:

$$z_v=6\text{ mm}\quad r_c=-1.69\text{ mm}\quad d=-0.05215\quad e=0.003034$$

This profile only needs minor modification to be suitable for preferred embodiments illuminating other shelf distances.

Figure 6A:
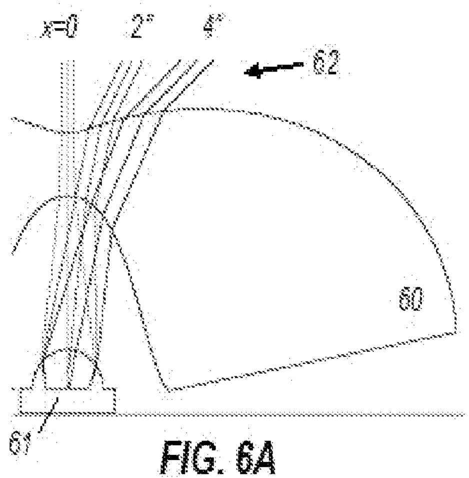
FIG. 6A-6F show source-image rays from across the target.

FIG. 6A through 6F shows illumination lens 60 and LED chip 61. In FIG. 6A, rays 62 come from points on the shelf at the indicated x coordinates of 0, 2", and 4" laterally from the lens. Each bundle is just wide enough that its rays end at the edges of chip 61, which is the definition of a source image. Each bundle is narrower than chip 61 would appear by itself, in accordance with the previously discussed demagnification. The central portion of lens 60 that is traversed by rays 62 can be seen to be a concave, diverging lens, as previously mentioned.

Figure 6B:
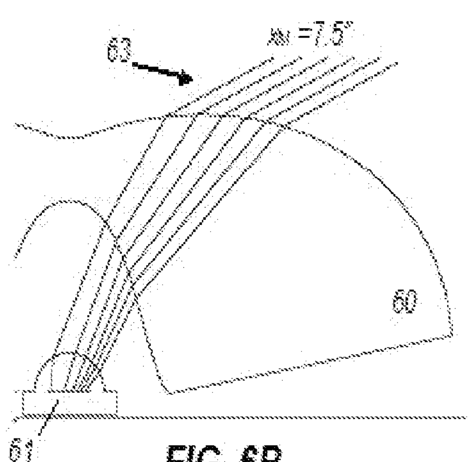

FIG. 6B shows ray bundle 63 proceeding from the distance $x_M$ to the maximum of the illumination pattern in FIG. 2. It is twice the width of those in FIG. 6A.

Figure 6C:
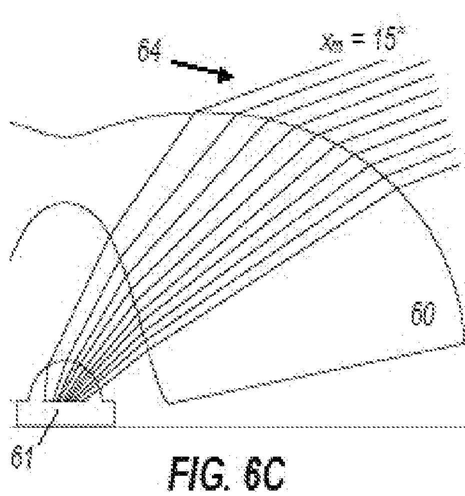

FIG. 6C shows ray bundle 64 proceeding from the distance $x_m$ to the middle of the shelf, as shown in FIG. 2.

Figure 6D:
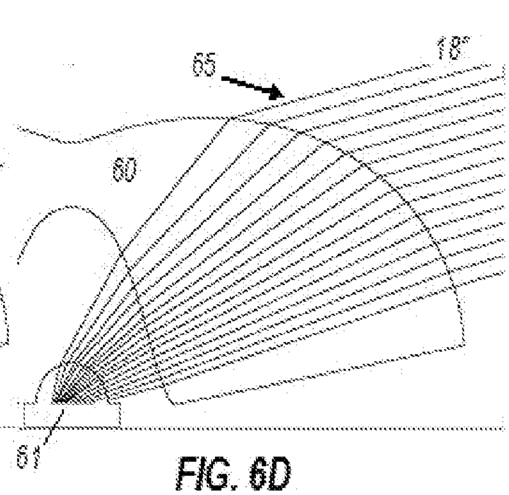

FIG. 6D shows ray bundle 65 proceeding from beyond mid shelf, at 18".

Figure 6E:
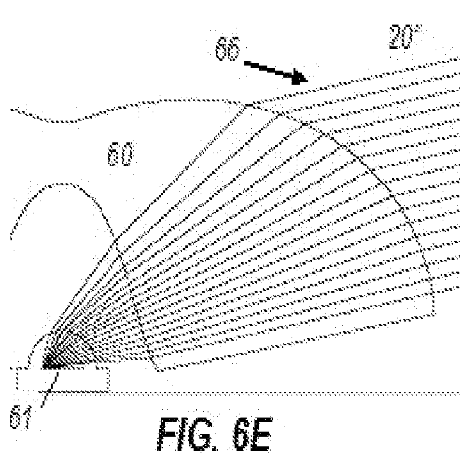

FIG. 6E shows ray bundle 66 proceeding from beyond mid shelf, at 20", nearly filling the lens. This is the maximum source magnification this sized lens can handle.

Figure 6F:
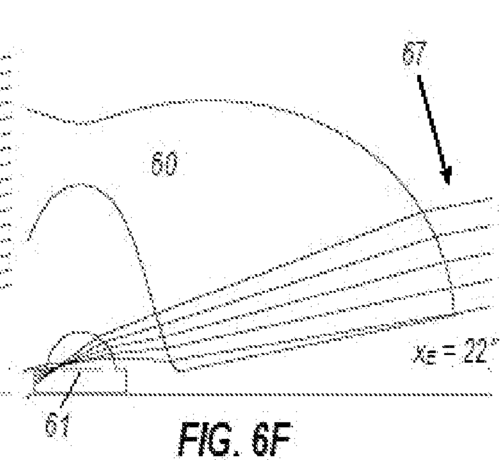

FIG. 6F shows ray bundle 67 proceeding from the edge of the illumination pattern, at $x_E$=22". Note that these rays miss chip 61, indicating that there will be no light falling there, which is required by the pattern cutoff.

The progression of FIG. 6A through 6F is the basis for the numerical generation of the upper and lower surface profiles of the lens, starting at the center and working outwards, as will be disclosed below. The results of this method can sometimes be closely approximated by the geometry of FIG. 5.

The illumination lens of FIG. 5 has elliptical and aspheric-parabolic surfaces with shapes that are exactly replicable by anyone skilled in the art. In the illumination pattern of FIG. 2, the central depression to ¾ the maximum value was empirically found to work with the lens array of FIG. 1, with six lenses on each side. This lens is the first commercially available design enabling only six LEDs to be used, rather than the dozen or more of the prior art. More recently, however, even higher-power LEDs have become available that only require two per door, as FIG. 7 illustrates.

Figure 7:
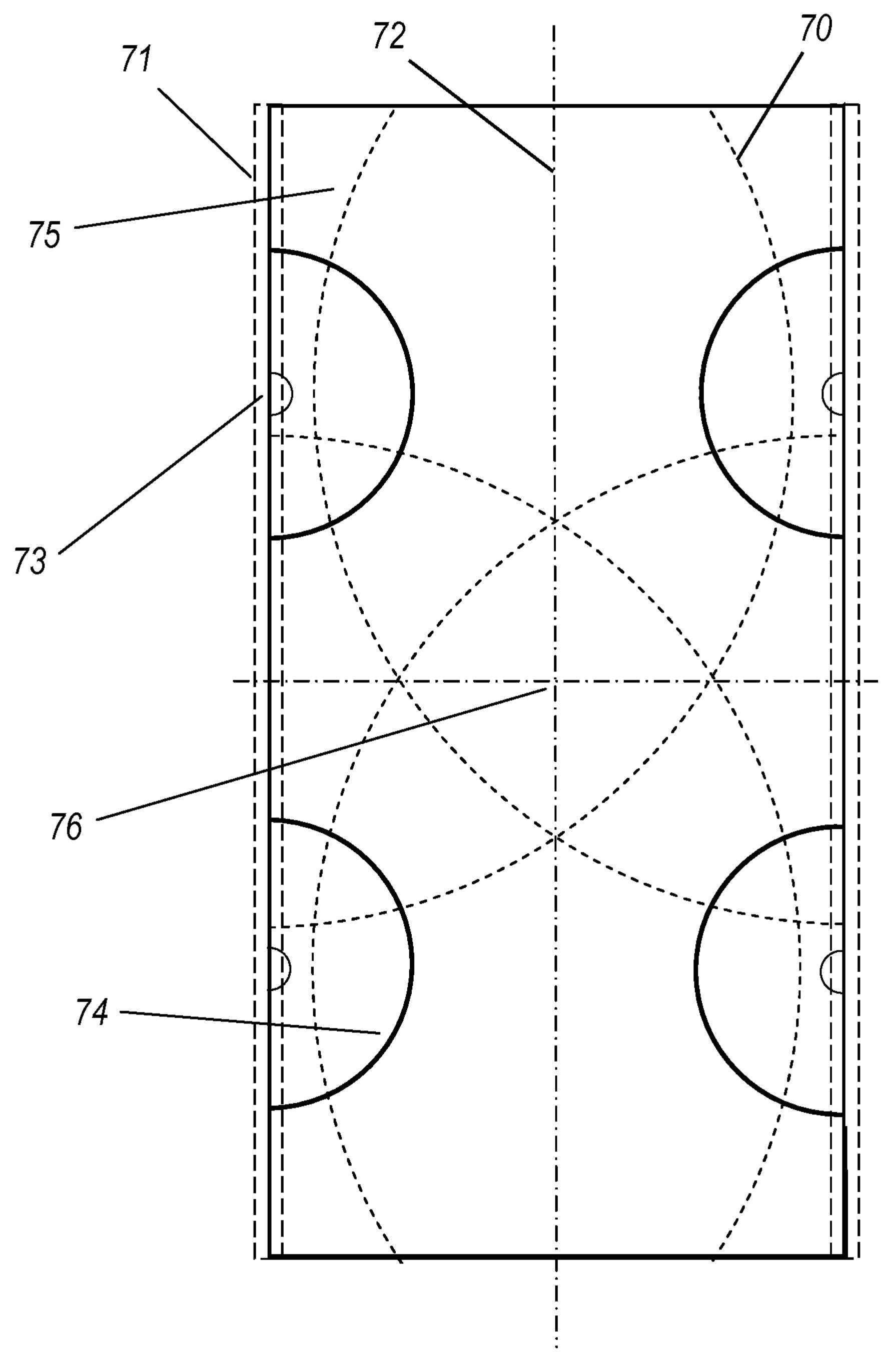
FIG. 7 shows how a rectangular door is illuminated by only 4 LEDs.

FIG. 7 shows rectangular outline 70 representing a typical refrigerator door that is 30" wide and 60" high, with other doors, not shown, to either side. Dashed rectangles 71 denote the mullions behind which the shelf lighting is mounted, typically at 3-6" from the front of the illuminated shelves. This is much closer than the distance to the shelf center, denoted by centerline 72. There are four illuminators (two on either side), denoted by small circles 73. Each illuminator produces an illuminated circle with its peak on a ring denoted by solid circles 74 and its edge on dotted circles 75. Here the circles 74 have radius of about a fifth of the shelf width, or a third the way to centerline 72. The circles 75, where illuminance has fallen to zero, are sized to reach nearly all the way across the shelf. As in FIG. 1, each pattern has the value ½ at centerline 72, so two lenses add to unity. Also, at shelf center-point 76 the four patterns overlap, so at this distance each pattern must have the value ¼, and thus add to unity. This same configuration is applicable for LCD backlights comprising square-arrayed LEDs, merely on a smaller scale. This arrangement of precisely configured illumination lenses is capable of generating uniformity satisfactory for LCD backlights.

The LEDs used in the arrangement of FIG. 7 must be three times as powerful as those used for FIG. 1. This greater flux has unwanted consequences of triply enhanced scattered light, strengthened even more by the greater size of the lenses used for FIG. 7 versus the smaller ones which would suffice for FIG. 1. The illumination pattern of FIG. 2 has a central dip in order to compensate for the close spacing of the lenses. When scattering is significant, however, the scattered light can be strong enough to provide all the illumination near the lens. The upshot is that the illumination pattern shown in FIG. 2 would have nearly zero intensity on-axis. The resultant lens has a previously unseen feature: either or both surfaces have a central cusp that leaves no direct light on the axis, resulting in a dark center for the pattern, in order to compensate for the scattered light.

Figure 8:
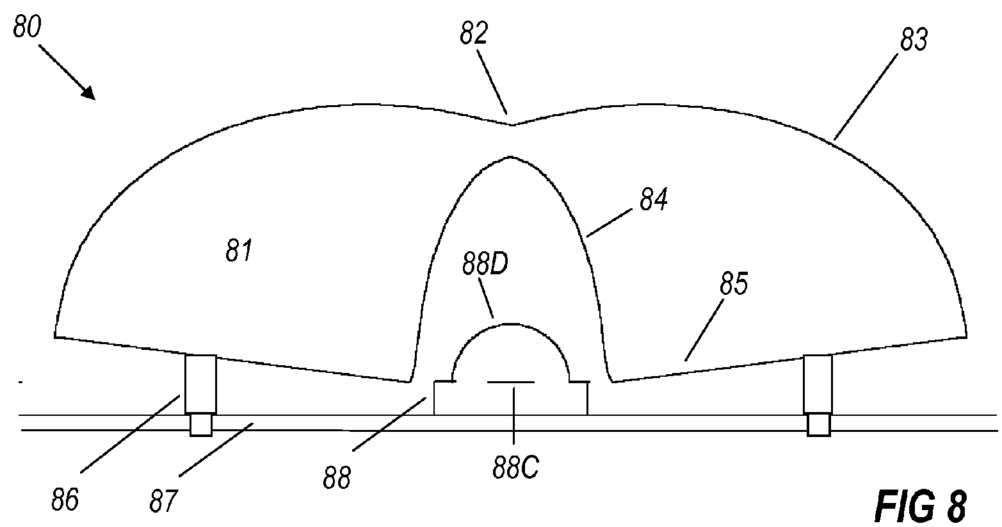
FIG. 8 shows a cross-section of a further illumination lens and LED.

FIG. 8 is a cross-section of illuminator 80, comprising circularly symmetric illumination lens 81, bounded by an upper surface comprising a central cusp 82 formed by a surrounding toroid with tailored arc 83 as its profile. Lens 81 is also bounded by a lower surface comprising a central cavity with tailored profile 84 preferably peaking at its tip, and surrounding it an optically inactive cone joining the upper surface, with straight-line profile 85 and pegs 86 going into circuit board 87. Illuminator 80 further comprises centrally located LED package 88 with emissive chip 88C immersed in transparent hemispheric dome 88D.

The optically active profiles 83 and 84 of FIG. 8 are said to be tailored due to the specific numerical method of generating it from an illumination pattern analogous to that of FIG. 2, but with little or no on-axis output. The reason for this is, as aforementioned, to compensate for real-world scattering from the lens. The profiles 83 and 84 only control light propagating directly from chip 83C, through dome 83D, and thence refracted to a final direction that ensures attainment of the required illumination pattern. This direct pattern will be added to the scattering pattern of indirect light, which thus needs to be determined first.

Figure 9:
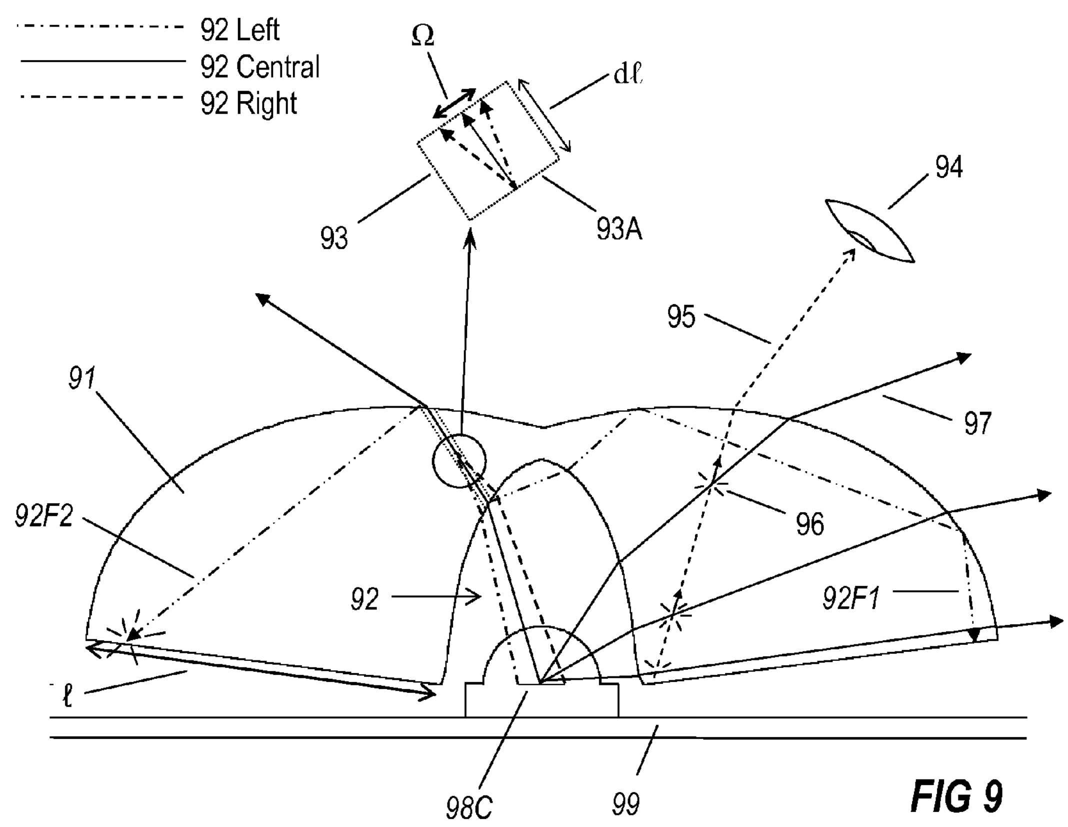
FIG. 9 illustrates a mathematical description of volume scattering.

FIG. 9 shows illumination lens 91, identical to lens 81 of FIG. 8, with other items thereof omitted for clarity. From LED chip 98C issues ray bundle 92, comprising a left ray (dash-dot line), a central ray (solid line), and a right ray (dashed line), issuing respectively from the left edge, center, and right edge of LED chip 98C. Anywhere within lens 91, these rays define the apparent size of chip 98C and thus how much light is passing through a particular point. Any light scattered from such a point will be a fixed fraction of that propagating light. The closer to the LED the more light is present at any point, and the greater the amount scattered. This scattering gives the lens its own glow, separate from the brightness of the LED itself when directly viewed.

Strictly speaking, scattering does not take place at a point but within a small test volume, shown as infinitesimal cube 93 in FIG. 9, magnified for clarity. It is oriented along the propagation direction of ray bundle 92. It has cross-section 93A of area dA and propagation length dl, such that its volume is simply dV=dl dA. Within cube 93 can be seen the left, central, and right rays of bundle 92, now switched sides. The right and left rays define solid angle Ω, indicating the apparent angular size of LED chip 98C as seen from cube 93 within lens 91. The greater this solid angle the more light will be going through cube 93. LED chip 98C has luminance L, specified in millions of candela per square meter. This is reduced when ray bundle 92 goes into lens 91, due to less-than-unity transmittance τ caused by Fresnel reflections. Going into cube 93 the ray bundle 92 has intensity I given simply by I=τ L dA. The total flux F passing through cube 93 is then given, simply again, by F=I Ω.

Volume scattering removes a fixed fraction of this intensity I per unit length of $$I(l)=I(0)e^{-\kappa l}$$

propagation, similar to absorption. Both are described by Beer's law:

Here I(0) is the original intensity and I(l) is what remains after propagation by a distance l, while scattering coefficient κ has the dimension of inverse length. It can easily be determined by measuring the loss in chip luminance as seen through the lens along the path l of u) FIG. 9.

Returning to cube 93 of FIG. 9, the ingoing intensity I is reduced by the small amount $dI=e^{-\kappa dl}$. This results in a flux decrement dF=dI Ω that is subtracted from F. Then the emission per unit volume is dF/dV. Integrating this over the entire optically active volume of lens 91 gives the total scattered light. FIG. 9 further shows observer 94 gazing along line of sight 95, along which direct rays 97 give rise to scattering points 96, summing into a lens glow that acts as a secondary light source surrounding the LED.

These scattering phenomena are usually looked upon as disadvantageously parasitic, acting only to detract from optical performance. There is a new aspect to this, however, where some volume scattering would be beneficial. It arises in the subtle failings of current high-brightness LEDs, namely that of not delivering the same color in all directions. More specifically, many commercially available LEDs with multi-hundreds of lumens output, look much yellower when seen laterally than face-on. This is because of the longer path through the phosphor taken by light from the blue chip.

Thick phosphors have uniform whiteness, or color temperature, in all directions, but they reduce luminance due to the white light being emitted from a much bigger area than that of the blue chip. Conformal coatings, however, are thin precisely in order to avoid enlarging the emitter, but they will therefore scatter light much less than a thick phosphor and therefore do much less color mixing. As a result, lateral light is much yellower (2000 degrees color temp) and the face-on light much bluer (7000 degrees) than the mean of all directions. As a result of this unfortunate side-effect of higher lumen output, the lenses disclosed herein will exhibit distinct yellowing of the lateral illumination, and a distinct bluing of the vertical illumination.

The remedy for this inherent color defect is to use a small quantity of blue dye in the lens material. Since the yellow light goes through the thickest part of the lens, the dye will automatically have its strongest action precisely for the yellowest of the LEDs rays, those with larger slant angles. The dye embedded in the injection-molding material should have an absorption spectrum that only absorbs wavelengths longer than about 500 nm, the typical spectral crossover between the blue LED and the yellow phosphor. The exact concentration will be inversely proportional to lens size as well as to the absorption strength of the specific dye utilized.

A further form of scattering arises from Fresnel reflections, aforementioned as reducing the luminance of rays as they are being refracted. FIG. 9 further shows first Fresnel-reflected ray 92F1 coming off the inside surface of lens 91, then proceeding into the lens to be doubly reflected out of the lens onto circuit board 92F1. This ray has strength of (1−τ) relative to the original ray 92. Of similar strength is the other Fresnel-reflected ray, 92F2, which proceeds from the outer surface to the bottom of the lens. These two rays are illustrative of the general problem of stray light going where it isn't wanted. Unlike the volume scattering at points 96, these Fresnel-reflected rays can travel afar to produce displeasing artifacts. It has been well-known for many decades of optical engineering that the easiest way to deal with this is to institute surface scattering of these stray rays. Since the flat conical bottom surface 91C of lens 91 intercepts most of these stray Fresnel reflections, the tried-and-true traditional solution is simply to roughen the corresponding mold surface so that the Fresnel light is dissipated to become part of the above-described volume scattering. At the termination of ray 92F2 can be seen the scattered rays, some of which illuminate the top of board 99, which of course would also be scattering, such as by white paint.

Figure 10:
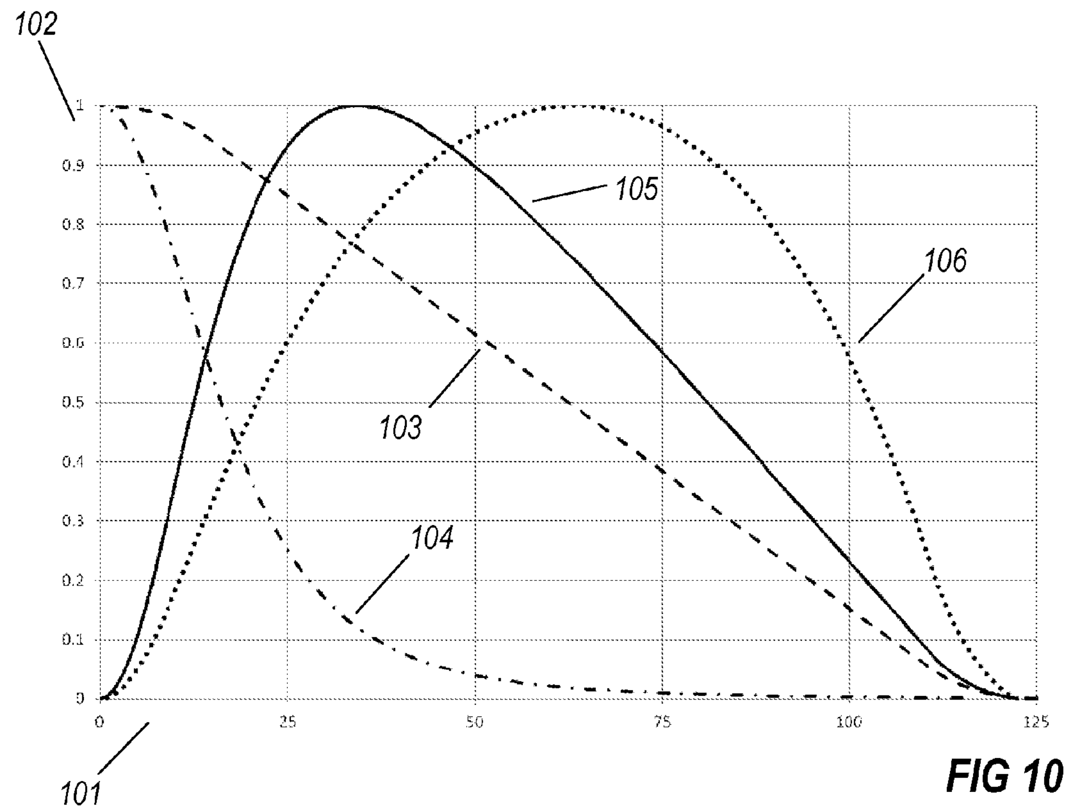
FIG. 10 is a graph of illumination patterns.

FIG. 10 shows graph 100 with abscissa 101 denoting distance in millimeters from the center of the lens of FIG. 9 and ordinate 102 denoting illuminance relative to the pattern maximum (in order to generalize to any illumination level). Dashed curve 103 is the ideal illumination pattern desired for the configuration of FIG. 7, given an inter-lens spacing of 125 mm and a target distance of 23 mm. These dimensions represent a backlight application, where the LEDs are arrayed within a white-painted box, and the target is a diffuser screen, with a liquid-crystal display (LCD) just above it. Increased LED luminosity mandates fewer LEDs, to save on cost, while aesthetics push for a thinner backlight. These two factors comprise a design-pressure towards very short-throw lighting.

The 'conical pattern' of curve 103 and its converse (not shown) from an illuminator at 125 mm, will add to unity, which assures uniform illumination. Dash-dot curve 104 depicts the combined parasitic illuminance on that target plane caused by the above-discussed volume and surface scattering from a lens at x=0. This curve is basically the $\cos^4$ of the off-axis angle to a point on the target. Solid curve 105 is the normalized difference between the other two curves, representing the pattern that when scaled will add to curve 104 to get a total illuminance following curve 103. In this case the scattered light of curve 104 is strong enough to deliver 100% of the required illuminance just above the lens. In such a case the central cusp 82 of FIG. 8 will ensure that the central illuminance is zero when only counting direct light that is delivered through the lens.

The illumination pattern represented by curve 105 of FIG. 10 can be used to numerically generate the inner and outer profiles of the lens 81 of FIG. 8, utilizing rays from the right and left edges of the source. Dotted curve 106 of FIG. 10 graphs the relative size of the source image height (as shown in FIG. 6A-F) required by the illuminance pattern of curve 105. This height function is directly used to generate the lens profiles.

Figure 11:
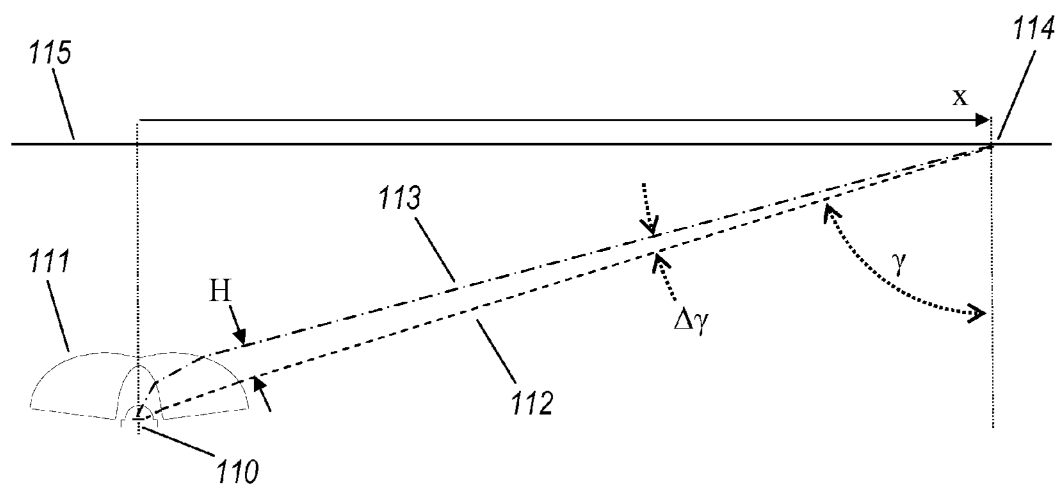
FIG. 11 sets up a 2D source-image method of profile generation.

FIG. 11 shows LED 110 and illumination lens 111, of 20 mm diameter, sending right ray 112 and left ray 113 to point 114, which has coordinate x on planar target 115, located 23 mm above LED 110. Right ray 112 hits point 114 at slant angle γ, and left ray 113 at slant angle γ+Δγ. In the two-dimensional analysis of FIG. 11, the illuminance I(x) at point x is proportional to the difference between the sines of the left and right rays' slant angles:

$$I(x) \alpha \sin(\gamma+\Delta\gamma)-\sin(\gamma)$$

This angular requirement can be met by the proper height H of the source image, namely the perpendicular spacing between right ray 112 and left ray 113, at the lens exit of 112. Curve 106 of FIG. 10 is a plot of this height H, relative to its maximum value. From this geometric requirement the lens profiles can be directly generated by an iterative procedure that adds new surface to the previously generated surface.

FIG. 12 shows incomplete illumination lens 121, positioned over LED 120. It is incomplete in that it represents a typical iteration-stage of generating the entire lens of FIG. 11. The portion of Lens 111 of FIG. 11 that is shown as a slightly thickened curve terminates at its intersection, shown as point 124, with right ray 122. In FIG. 12, a new left ray 123 is launched that is barely to the right of left ray 113 of FIG. 11. After going through terminal point 126 and then through previously generated upper surface 121, it will intercept the target (not shown) at a new point x+dx, just to the right of point x of FIG. 10. This point will have an already calculated source-height requirement such as curve 105 of FIG. 19, fulfilled by launching a new right ray 122 from x+dx. Ray 122 will intercept the lens surface at point 125, upon new surface that has been extended from point 124. The new surface has a slope determined by the necessity to deflect ray 122 towards point 126 on the interior surface of lens 121. The location of this point 127 is determined by right ray 122-S coming from the right edge of LED chip 120C. The off-axis angle of this ray is determined by the usual requirement that the angular-cumulative intensity of right ray 122S equal the spatially cumulative illumination at point x+dx, which is known from the desired illumination pattern, such as that shown by curve 105 of FIG. 10. The slope of this new interior surface, from point 126 to new point 127, is determined by the necessity of refracting ray 122S so it joins ray 122 to produce the proper source-image height for the illumination of the target at point x+dx. In this fashion, the generation of lens 121 will be continued until all rays from chip 120C are sent to their proper target coordinates, and its full shape is completed.

The profile-generation method just described is two-dimensional and thus does not account for skew rays (i.e., out-of-plane rays), which in the case of a relatively large source can give rise to noticeable secondary errors in the output pattern, due to lateral variations in the size of the source image. This effect necessitates a fully three-dimensional source-image analysis for generating the lens shape, as shown in FIG. 13.

The lens-generation method of FIG. 12 traces left ray 123 through the previously generated inner and outer surfaces to a target point with lateral coordinate x+dx. The pertinent variable is the height H of the source image. In three dimensions, however, rays must be traced from the entire periphery of the LED's emission window out to the target point, where they limit the image of the source as seen through the lens from that point. An illumination lens acts to alter the sources' apparent size from what it would be by itself. The size of the source image is what determines how much illumination the lens will produce at any target point.

FIG. 13A is a schematic view from above of circular illumination lens 130, with dotted lines showing is incomplete, its design iteration having only extended so far to boundary 131. Circular source 132 is shown at the center of lens 130, and oval 133 represents the source image it projects to target point x+dx (not shown). This source image is established by reverse ray tracing from the target point back through the lens to the periphery of the source. The source image is the oval outline 133 on the upper surface where these rays intercept it. Thus the already completed part of the lens will partially illuminate the target point, and a small element of new surface must be synthesized for full illumination.

FIG. 13B is a close-up view showing source ellipse 133 and boundary 131, also showing curve 134, representing a small element of new surface that will be added in order to complete source image 133 and achieve the desired illumination level at target point x+dx. Of course, when new upper surface is added there will have to be a corresponding element of new lower surface added as well. Just as enough there must be enough new upper surface to finish the source image, so too must there be enough lower surface to provide the source image to the upper surface. Since both the extent and slope of this new lower surface must be determined as free variables, the design method must be able to calculate both unknowns, but in general the slopes of the new elements of upper and lower surface will be smooth continuations of the previous curvatures of the surfaces.

Traditionally, non-imaging optics deals only with rays from the edge of the source, but the illumination lenses disclosed herein go beyond this when assessing the source image at each target point. The incomplete source image of FIG. 13B gives rise to a less-than-required illuminance at the target point of interest, at lateral coordinate x. In order to calculate this illuminance, however, rays must be reverse traced back to the entire source, not just its periphery. This is especially true when the source has variations in luminance and chrominance. Then the flux from each small elemental area dA of FIG. 13B is separately calculated and integrated over the source image as seen through already completed surface. The deficit from the required illuminance will then be made up by the new surface 134 of FIG. 13B. Its size is such that the additional source image area will just finish the deficit. When the illumination pattern only changes gradually, as with the linear ramps just discussed, the deficit is always modest because the previously generated surface has done a good job of getting close to the required illuminance. The new surface will not have to scrunch the new source image, due to a tiny deficit, nor expand it wildly for a large deficit, because the target pattern is 'tame' enough to prevent this.

This design method can be called 'photometric non-imaging optics', because of its utilization of photometric flux accounting in conjunction with reverse ray tracing to augment the edge-ray theorem of traditional non-imaging optics.

The iterative process that numerically calculates the shape of a particular illumination lens can begin, alternatively, at either the center or the periphery. If the lens diameter is constrained, the initial conditions would be the positions of the outer edges of the top and bottom surfaces, which then totally determines the lens shape, in particular its central thickness. If this thickness goes below a minimum value then the initial starting points must be altered. While this is conceptually feasible, in practical terms it leaves the problem underdetermined, whereas the reverse ray tracing of FIG. 13A utilizes the previously generated surface via reverse ray tracing. Thus it is easier to begin the design iteration at the center of the lens using some minimum thickness criterion, e.g., 0.75 mm. The height of the lens center above the source would be the primary parameter in determining the overall size of the lens. The other prime factor is how the central part of the lens is configured as a negative lens, that is, whether concave-plano, concave-concave, or plano-concave. Also, a concave surface can either be smooth or have the cusp-type center as shown in FIG. 8, in the case of strong parasitic losses.

Figure 14:
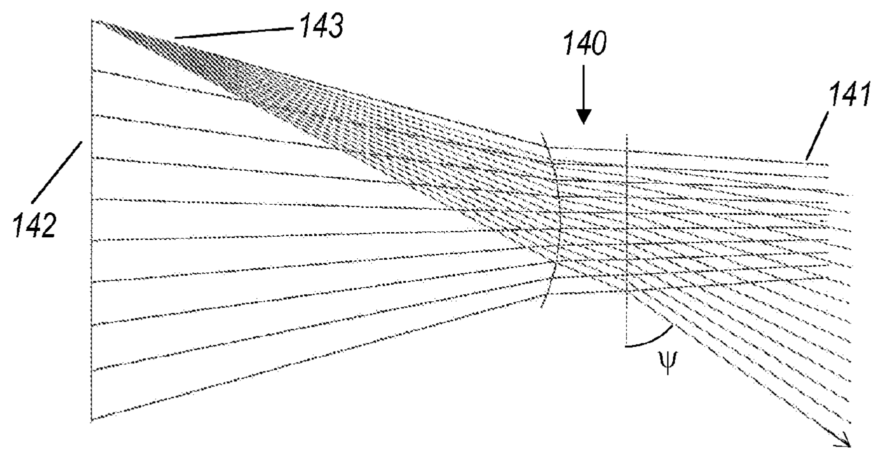
FIG. 14 shows a plano-convex lens-center, with defining rays.

FIG. 14 shows concave-plano lens-center 140, to be used as a seed-nucleus for generating an entire illumination lens. Its diameter is determined by the width of ray fan 141, which propagates leftward from the target center (not shown) x=0 at a distance of 23 mm above (to the right of) LED chip 142, the size of which has been exaggerated for clarity. Ray fan 141 has the width necessary to achieve the desired illumination level at the center of the target, and in short-throw lighting this is less than what the LED would do by itself. This means the central part of the illumination lens must demagnify the source, which is why the lens-center is diverging, with negative focal length. In fact, the very function of lens-center 140 is to provide the proper size of source image (of which ray fan 141 is a cross-section) for the target center, x=0.

FIG. 14 also shows expanding ray fan 143, originating at the left edge of chip 142. The will mark the upper edge of a source image as seen from the x-positions at which these left rays intercept the target plane (not shown, but to the right). These rays exemplify how edge rays are sent through previously established surfaces.

Figure 15:
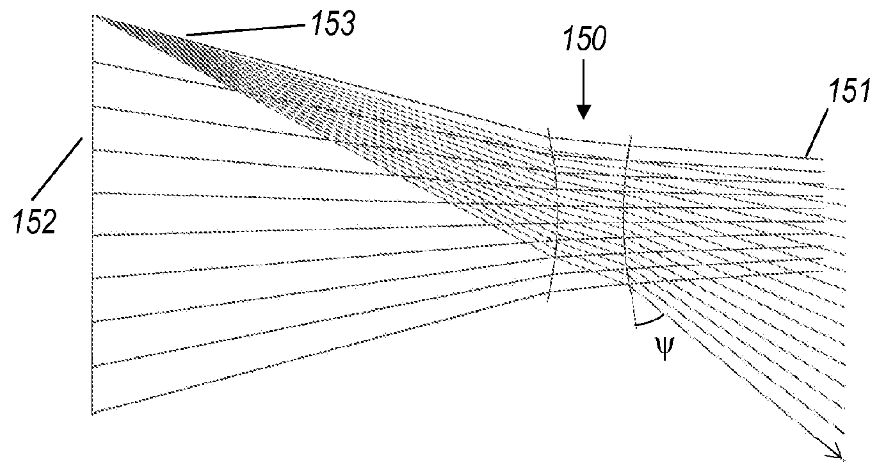
FIG. 15 shows a concave-concave lens-center, with defining rays.

FIG. 15 shows concave-concave lens-center 150, central ray-fan 151, chip 152, and left-ray fan 153. The lens surfaces have about half the curvature of the concave surface of FIG. 14.

Figure 16:
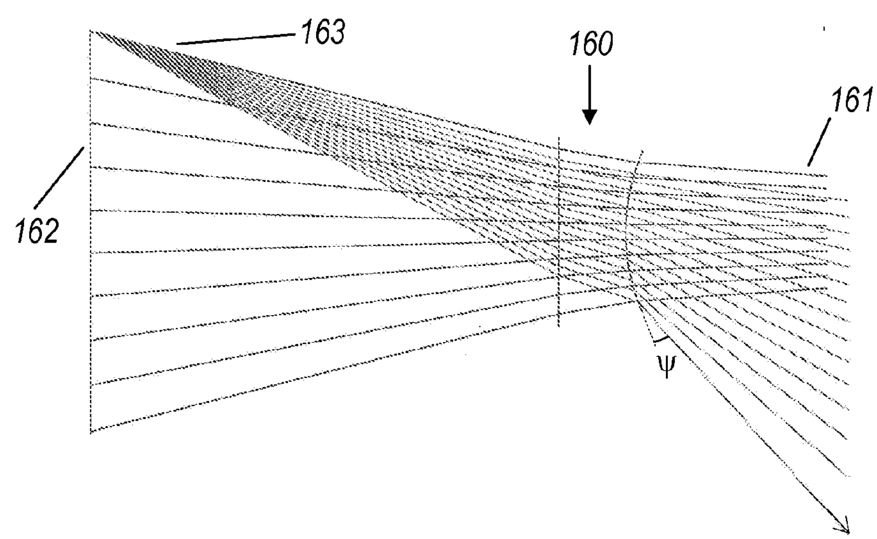
FIG. 16 shows a concave-plano lens-center, with defining rays.

FIG. 16 shows plano-concave lens-center 160, central ray-fan 161, chip 162, and left-ray fan 163.

In the progression from FIGS. 14 to 16, the lowest left ray (the one with an arrow) lies at a shrinking slant angle ψ, indicating different illumination behavior and setting a different course towards the final design. All three configurations produce the same illuminance at target x=0, that is to say the same size source image, as shown by the ray fans 141, 151, & 161 being of identical size as they arrive at each lens, which is equivalent to saying they produce the same target illuminance at center x=0.

In FIG. 16, a plano-concave lens-center 160 is defined by a ray-fan 161, which proceeds from the center of the short-throw target (not shown). The width of the ray-fan 161 as it enters the lens-center 160 is determined by an illumination prescription, which may be less than what LED chip 162 would illuminate by itself. Hence ray-fan 161 is seen to be expanded by the lens-center 160 so it diverges to cover LED chip 162.

Figure 19:
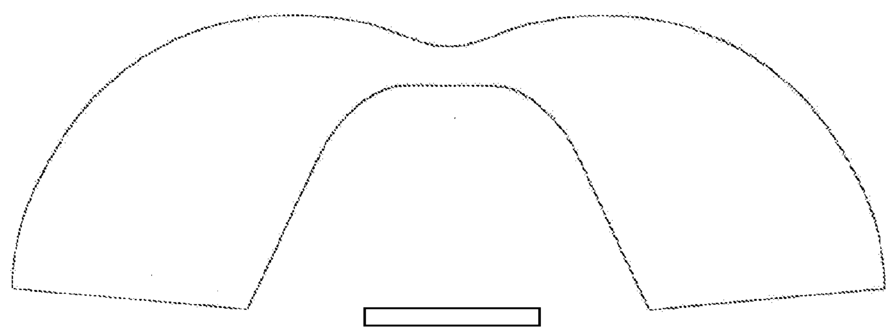
FIG. 19 shows the complete lens made from the lens-center of FIG. 16.
Figure 20:
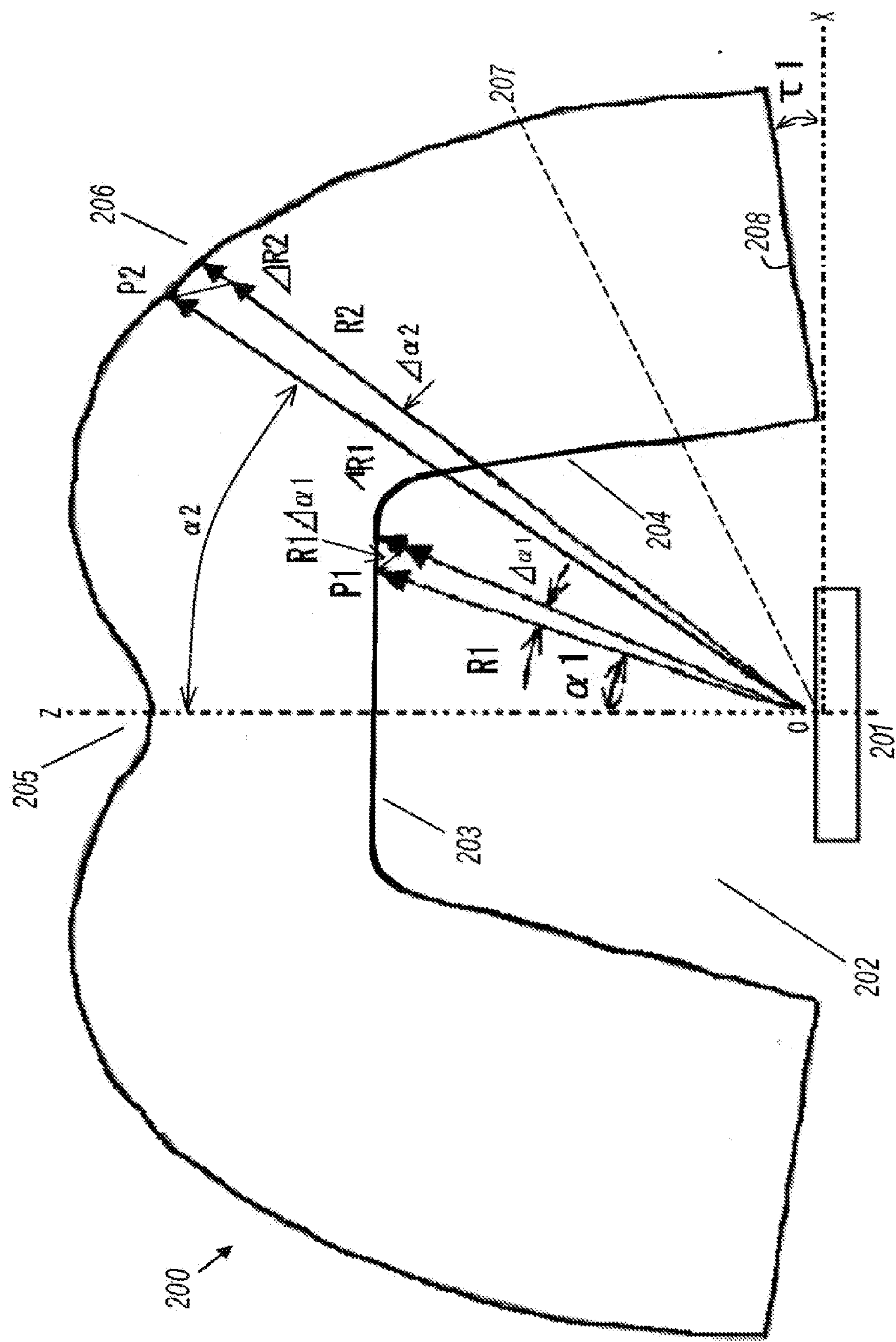
FIG. 20 shows a short throw illumination lens according to FIG. 19.

The diverging ray-fan 163 proceeds from the left edge of the LED chip 162, and goes through the lens-center 160 and then out to the short-throw target. These rays from the ray-fan 163 help guide the synthesis of the rest of the illumination lens, as shown in FIGS. 19 and 20 below.

In FIG. 16, ray-fan 163 diverges more for this type of lens-center than those of the FIGS. 14 and 15, as shown by smaller slant angle ψ. Thus the plano-concave type of illumination lens shown in FIGS. 19 and 20 may be appropriate for illumination prescriptions involving arrays of lenses rather than just one acting alone, for instance.

Figure 17:
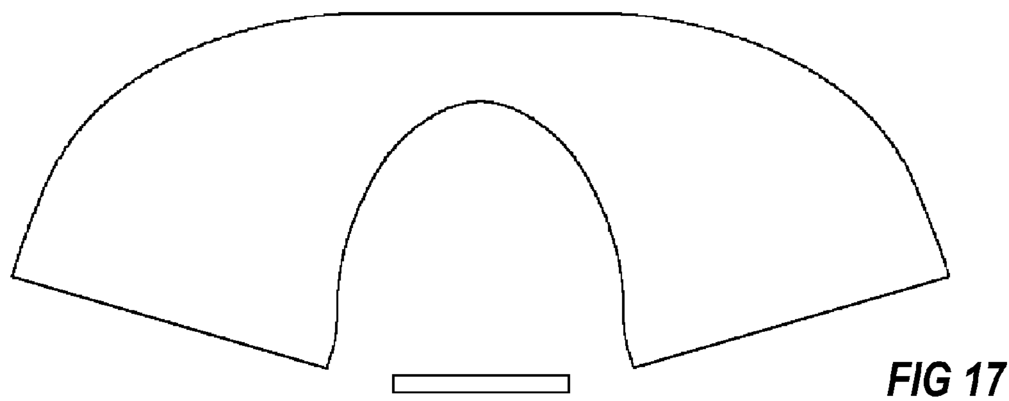
FIG. 17 shows the complete lens made from the lens-center of FIG. 14.

FIG. 17 shows illumination lens 170, numerically generated from a concave-plano center-lens, as in FIG. 14. Planar source 171 is the light source from which it was designed.

Figure 18:
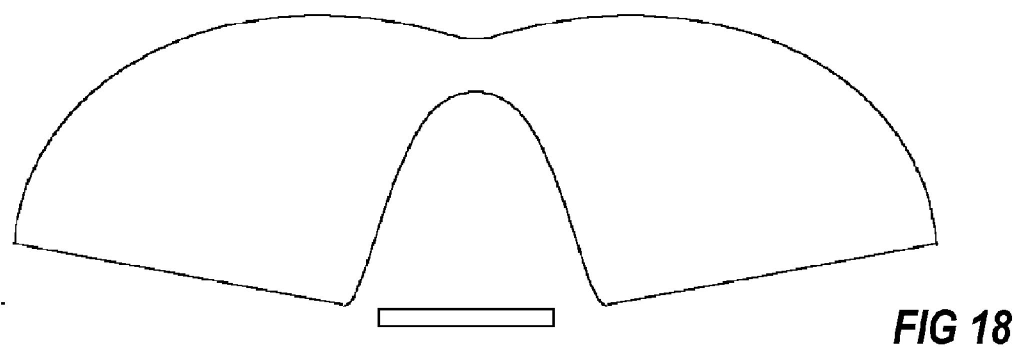
FIG. 18 shows the complete lens made from the lens-center of FIG. 15.

FIG. 18 shows illumination lens 180, numerically generated from a concave-concave center-lens, as in FIG. 15. Planar source 181 is the light source from which it was designed.

FIG. 19 shows illumination lens 190, numerically generated from a plano-concave center-lens, as in FIG. 16. Planar source 191 is the light source from which it was designed.

FIG. 20 shows a short throw (i.e. illumination) lens 200, and its related geometry. FIG. 20 is similar to the illumination lens of FIG. 19, but is shown in more detail. The short throw lens 200 and the geometry thereof may be further explained as described above with respect to FIGS. 3-5. The short throw lens 200 may be useful as a BLU lens for LCD displays.

A planar light source 201, which may be a light emitting diode, is arranged under the short throw lens 200. The short throw lens 200 has inside and outside surfaces 204 and 206, respectively, while 208 is the bottom surface of the short throw lens 200 connecting the inside and outside surfaces 204 and 206. A central cavity 202 of the short throw lens 200 comprises a flat top 203 and lateral flanks 204. The flat top 203 is substantially parallel to an extension direction of the light source 201. The outer surface of the short throw lens 200 comprises a central indentation 205 and surrounding toroid 206. The central indentation 205 acts as a diverging lens, as described above with respect to FIG. 16.

Tilted axis 207 aims in the direction of maximum source-image size, towards the place on a short-throw target (e.g., an external surface to be illuminated, not shown), where the short throw lens 200 has the greatest magnification. The exact location of this place depends upon the particular illumination prescription, but it is generally about halfway to the edge of the target. Thus, the tilted axis 207 is a line drawn from the center point 0 of the light source 201 through the point of maximum magnification on the second surface 206, which points to the midpoint of the short-throw target.

The bottom surface 208 of the short throw lens 200 is inclined by an angle $\tau_1$, which represents the angle that that the bottom surface 208 makes with respect to the horizontal optical axis X. Angle $\tau_1$ creates the tilted axis 207. The short throw lens 200 may be ellipsoidal, and the bottom surface 208 may be inclined by the angle $\tau_1$ along the major and minor axes of the ellipsoid.

Figure 21:
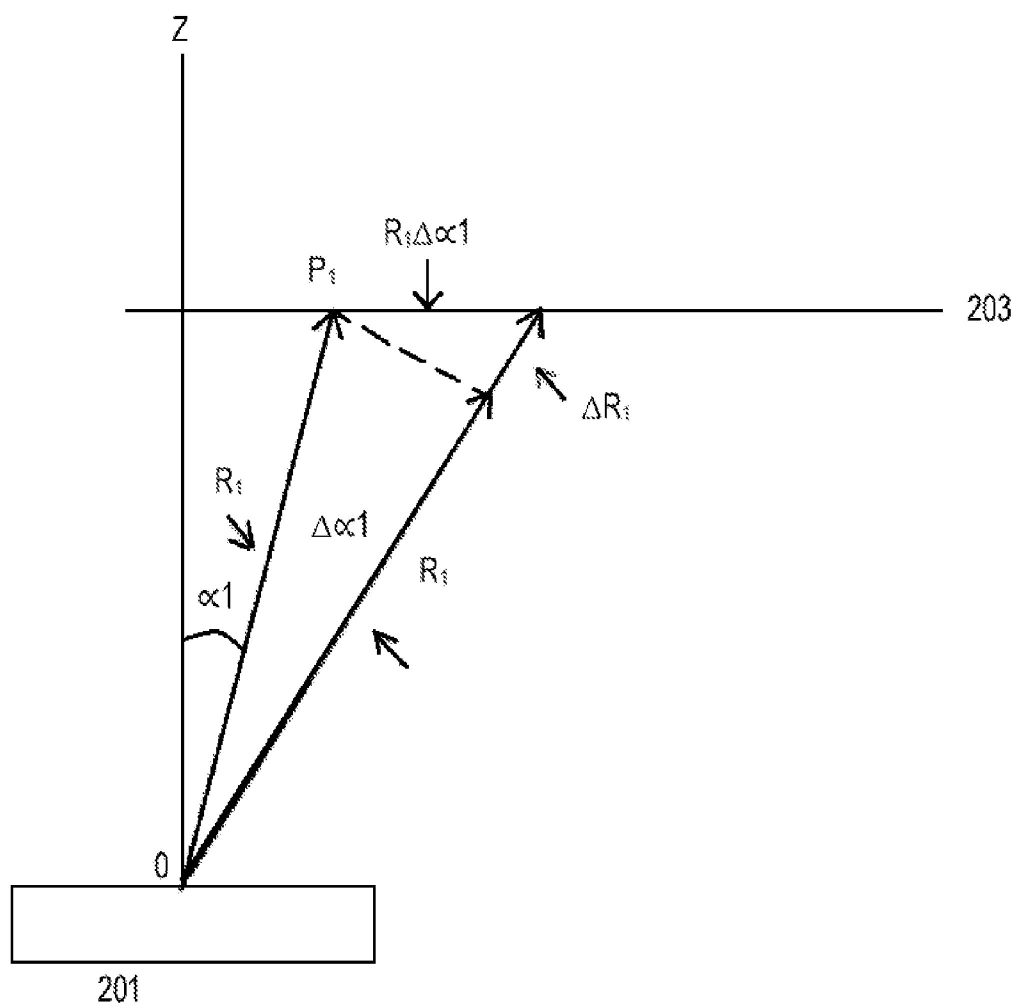
FIG. 21 shows a detailed view of features of the short throw illumination lens of FIG. 20.

$R_1$ is the radius vector representative of a light ray leaving the light source 201 and incident on the flat top 203 or the inside surface 204 of the central cavity 202 of at point P1. Angle $\alpha_1$ represents the angle that that $R_1$ makes with respect to the vertical optical axis Z. It should be noted that the central cavity 202 is axisymmetrical with respect to optical axis Z. Radius vector $R_1$ has monotonically increasing values, represented by $\Delta R_1$, in the range of 0 to 25° as $\alpha_1$ increases incrementally ($\Delta\alpha_1$). This is due to the fact that the flat top 203 of the central cavity 202 is substantially flat in the angular range of 0 to 25°. FIG. 21 shows a detailed view of these features.

$R_2$ is the radius vector to the light ray exiting the outside surface 206 of the short throw lens 200 at point P2, while $\alpha_2$ represents the angle that that ray makes with respect to the vertical optical axis Z, and $\Delta R_2$ is the incremental change in $R_2$ as $\alpha_2$ increases incrementally ($\Delta\alpha_2$). $R_2$ monotonically increases as $\alpha_2$ increases in a range of 0 to 60°. The toroidal portion of the outside surface 206 is axisymmetrical with respect to the vertical optical axis Z. In order to avoid total internal reflection of light emitted from the light source 201 into the short throw lens 200, $A_2<1/\sqrt{(n^2-1)}$, where n is a refraction index of a material forming the illumination lens, and $A_2=\Delta R_2/(R_2\Delta\alpha_2)$. Here, the short throw lens 200 is made of a transparent material having an index of refraction between 1.41 and 1.65.

The painted bottom surface 208 of the short throw lens 200 may be configured to absorb internal (e.g., Fresnel) reflection of light emitted by the light source 201. The bottom surface 208 may be painted such that the absorptivity of the bottom surface 208 is at least 80%, and preferably 90%. The bottom surface 208 of the short throw lens 200 may be painted with a black paint in order to increase absorptivity. Alternatively, the top of a printed circuit board on which the short throw lens 200 may be mounted (not shown), can be similarly painted in order to increase absorptivity.

These three lenses were designed utilizing rays from the periphery of the light source, in this case circular. The size of the lens is a free parameter, but etendue considerations dictate that a price be paid for a lens that is too small. In the case of a collimator, the output beam will be inescapably wider than the goal if the lens is too small. In the case of the short-throw illumination lenses disclosed herein, the result will be an inability to maintain an output illumination pattern that is the ideal linear ramp of curve 103 of FIG. 10, because it requires the source image of curve 106. If the lens is smaller than the required source image size, then it cannot supply the required illumination. Thus the lens size will be a parameter fixed by the goal of a linear ramp. Lenses that are too small will have some rays trapped by total internal reflection instead of going to the edge of the pattern. If this is encountered in the design process then the iteration will have to re-start with a greater height of the lens-center above the LED.

LED illumination lenses may need a circularly symmetric illumination lens that can be used in small numbers (such as five or six per mullion) and still attain uniformity, because the individual patterns are such that those few may add up to caustic-free uniformity. Thus, an objective of the present invention is to provide a lens with a circular illumination pattern that multiples of which will add up to uniformity across a rectangle. It is a further objective of the present invention to attain a smaller lens size than the above mentioned approaches, leading to device compactness that results in lower manufacturing cost.

The smaller lens size can be achieved by a specific tailoring of its individual illumination pattern. This pattern is an optimal annulus with a specific fall-off that enables the twelve patterns to add up to uniformity between the two illuminating mullions upon which each row of six illuminators are mounted. This fall-off at the most oblique directions is important, because this is what determines overall lens size. The alternative approaches are: (1) Each mullion illuminates 100% to mid-shelf and zero beyond, which leads to the aforementioned caustics; (2) Each mullion contributes 50% at the mid-point, falling off beyond it. The latter is the approach of the present invention.

In conclusion, the exemplary embodiments disclosed herein fulfill a most challenging illumination task, the uniform illumination of close planar targets by widely spaced lenses. Deviations from this lens shape that are not visible to casual inspection may nevertheless suffice to produce detractive visual artifacts in the output pattern. Experienced molders know that sometimes it is necessary to measure the shape of the lenses to a nearly microscopic degree, so as to adjust the mold-parameters until the proper shape is achieved.

Experienced manufacturers also know that LED placement is critical to illumination success, with small tolerance for positional error. Thus a complete specification of a lens shape necessarily requires a high-resolution numerical listing of points mathematically generated by a fully disclosed algorithm. Qualitative shape descriptors mean nothing to computer-machined injection molds, nor to the light passing through the lens. Unlike the era of manual grinding of lenses, the exactitude of LED illumination lenses means that without a numerical method of producing those lens-profile coordinates, there will be no lens.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An illumination lens, comprising:

a light incident surface that defines a cavity having rotational symmetry with respect to a central axis, the light incident surface configured to receive light from an underlying light emitting element;

a light exiting surface comprising a flat surface intersecting the central axis and a convex surface extended from the flat surface toward a side portion; and a bottom surface connecting the light incident surface and the light exiting surface, wherein:

an uppermost part of the light exiting surface has an infinite intersecting point with a horizontal axis vertical to the central axis in a cross-sectional view;

a lowermost part of the bottom surface has two intersecting points with the horizontal axis in the cross-sectional view; and the bottom surface comprises an inclined surface having an angle formed by the bottom surface with respect to the horizontal axis.

2. The illumination lens of claim 1, wherein a first portion disposed between the uppermost part of the light exiting surface and an uppermost part of the light incident surface has two intersecting points with the horizontal axis in the cross-sectional view.

3. The illumination lens of claim 1, wherein a second portion disposed between the uppermost part of the light incident surface and the lowermost part of the bottom surface has four intersecting points with the horizontal axis in the cross-sectional view.

4. The illumination lens of claim 1, wherein the lens at the uppermost part of the light incident surface has three intersecting points with the horizontal axis in the cross-sectional view.

5. The illumination lens of claim 1, wherein the flat surface of the light exiting surface is superposed on a center of the light incident surface.

6. The illumination lens of claim 1, wherein the light incident surface comprises concave surfaces facing each other with respect to the central axis.

7. An illumination lens, comprising:

a light incident surface that defines a cavity having rotational symmetry with respect to a central axis, the light incident surface configured to receive light from an underlying light emitting element;

a light exiting surface comprising a flat surface intersecting the central axis and a convex surface extended from the flat surface toward a side portion;

a bottom surface connecting the light incident surface and the light exiting surface; and at least one peg disposed on a rim of the bottom surface, wherein:

an uppermost part of the light exiting surface has an infinite intersecting point with a horizontal axis vertical to the central axis in a cross-sectional view; and a lowermost part of the bottom surface has two intersecting points with the horizontal axis in the cross-sectional view.

8. A light emitting device, comprising:

a light emitting element disposed on a printed circuit board; and an illumination lens, comprising:

a light incident surface that defines a cavity having rotational symmetry with respect to a central axis, the light incident surface configured to receive light from the light emitting element;

a light exiting surface comprising a flat surface intersecting the central axis and a convex surface extended from the flat surface toward a side portion; and a bottom surface connecting the light incident surface and the light exiting surface, wherein:

an uppermost part of the light exiting surface has an infinite intersecting point with a horizontal axis vertical to the central axis in a cross-sectional view; and a lowermost part of the bottom surface has two intersecting points with the horizontal axis in the cross-sectional view, wherein an upper surface of the printed circuit board comprises an absorptive material.

9. A light emitting device of claim 8, wherein the absorptive material is black.

10. A light emitting device, comprising:

a light emitting element disposed on a printed circuit board; and an illumination lens, comprising:

a light incident surface that defines a cavity having rotational symmetry with respect to a central axis, the light incident surface configured to receive light from the light emitting element;

a light exiting surface comprising a flat surface intersecting the central axis and a convex surface extended from the flat surface toward a side portion; and a bottom surface connecting the light incident surface and the light exiting surface, wherein:

an uppermost part of the light exiting surface has an infinite intersecting point with a horizontal axis vertical to the central axis in a cross-sectional view; and a lowermost part of the bottom surface has two intersecting points with the horizontal axis in the cross-sectional view; and an absorptive material disposed between the bottom surface and the printed circuit board.

11. A light emitting device of claim 10, wherein the absorptive material is black.

* * * * *